Patented Oct. 16, 1923.

1,470,885

UNITED STATES PATENT OFFICE.

JAMES M. SHERMAN, OF WASHINGTON, DISTRICT OF COLUMBIA, AND ROSCOE H. SHAW, OF CHICAGO, ILLINOIS, DEDICATED, BY MESNE ASSIGNMENTS, TO THE PEOPLE OF THE UNITED STATES.

PROCESS FOR THE PRODUCTION OF PROPIONATES AND PROPIONIC ACID.

No Drawing. Application filed August 26, 1922. Serial No. 584,542.

(FILED UNDER THE ACT OF MARCH 3, 1883, 22 STAT. L., 625.)

*To all whom it may concern:*

Be it known that we, JAMES M. SHERMAN and ROSCOE H. SHAW, citizens of the United States of America, the former an employee of the Department of Agriculture of the United States of America, residing at Washington, D. C., and Chicago, Illinois, respectively, have invented a new and useful Process for the Production of Propionates and Propionic Acid, of which the following is a specification.

This application is made under the act of March 3, 1883, chapter 143 (22 stat., 625) and the invention herein described and claimed may be used by the Government of the United States, its officers and employees, and by any person in the United States either in public or private work without payment to us of any royalty thereon.

Our invention relates to a process for the fermentation of lactose and other carbohydrates, and of lactates and other fermentable organic salts, whereby propionates together with variable amounts of salts of acids homologous to propionic acid are formed.

The raw material may be a solution of pure or crude lactose or other carbohydrate or mixture of carbohydrates; whey, skim-milk, or other substance containing a carbohydrate or a mixture of carbohydrates; lactates or other fermentable organic salts from fermentation processes or of other origin. Limestone, precipitated calcium carbonate, or other so-called "buffers" may be used to neutralize the acids formed during fermentation and to maintain the most desirable hydrogen-ion concentration.

The fermentation is caused by bacteria;— e. g., the so-called *Bacterium acidi propionici*, which ferment carbohydrates and certain organic salts to produce therefrom propionates and smaller amounts of other organic salts, such as acetates. The cultures may be pure or may contain certain allowable foreign organisms.

The solution of salts of propionic and other acids resulting from the fermentation may be treated with a non-volatile acid such as sulphuric acid and the resulting propionic acid and other volatile acids distilled off. The solution may be filtered, or concentrated by evaporation, or both, before acidification and distillation; or it may be concentrated, then acidified, then filtered, and finally distilled. The resulting solution of acids may be separated into its constituent acids by the well-known methods used in the refining of acetic acid.

The mixture of propionic and other volatile acids may be utilized for the production of a mixture of ketones;—principally acetone methyl-ethyl ketone, and diethyl ketone;— by first forming an alkali or alkaline-earth salt of the acids, evaporating to dryness, and subjecting the dry salts to distillation at temperatures around 400° centigrade. Solvents of various boiling ranges between 50° and 105° centigrade may be obtained by fractional distillation of the ketone mixture. The crude material obtained by evaporating the product of the propionic fermentation to dryness without any purification may be distilled for the production of ketones, but the ketones thus produced are objectionable on account of their disagreeable odor.

The process may be better understood from the following example, to which, however, the invention is not limited:—1000 lbs. of whey are sterilized, and to it are added 40 lbs. of pulverized limestone and 40 lbs. of an inoculating liquid, which may be whey, containing propionate-producing bacteria substantially free from other organisms. The whey is protected from bacterial contamination, is maintained at a temperature of approximately 38° centigrade, and may be agitated frequently. At the end of ten days, the fermented whey is filtered through a filter press and the filtrate concentrated to about 150 lbs. weight. Sufficient 66° Baumé sulphuric acid is added to the cooled material so that Congo red paper is turned distinctly blue when dipped in the liquid. The liquid is then distilled till no more acid distills over. Steam is run into the still frequently, or continuously, to prevent the residual material from becoming dry and to prevent decomposition of the excess sulphuric acid. The product of the distillation is a mixture of propionic and acetic acids principally.

We claim:

1. The process of producing propionates by treating lactose with organisms of the type of *Bacterium acidi propionici*, and separating from the resulting fermentation mixture the propionics therein produced.

2. The process of producing propionic acid by treating lactose with organisms of the type of *Bacterium acidi propionici*, and separating from the resulting fermentation mixture the propionic acid therein produced.

3. The process of producing propionates by treating salts of lactic acid with organisms of the type of *Bacterium acidi propionici*, and separating from the resulting fermentation mixture the propionics therein produced.

4. The process of producing propionic acid by treating salts of lactic acid with organisms of the type of *Bacterium acidi propionici* and separating from the resulting fermentation mixture the propionic acid therein produced.

5. The process of converting fermentable organic acids into propionates by the use of organisms of the type of *Bacterium acidi propionici* and separating from the resulting fermentation mixture the propionates therein produced.

6. The process of converting fermentable organic acids into propionic acid by the use of organisms of the type of *Bacterium acidi propionici* and separating from the resulting fermentation mixture the propionic acid therein produced.

7. The process of producing propionates by treating carbohydrates with organisms of the type of *Bacterium acidi propionici* and separating from the resulting fermentation mixture the propionates therein produced.

8. The process of producing propionic acid by treating carbohydrates with organisms of the type of *Bacterium acidi propionici* and separating from the resulting fermentation mixture the propionic acid therein produced.

JAMES M. SHERMAN.
ROSCOE H. SHAW.